United States Patent [19]

Mizukami et al.

[11] Patent Number: 5,185,312
[45] Date of Patent: Feb. 9, 1993

[54] METHOD OF PRODUCING A CATALYST FOR THE DECOMPOSITION OF HYDRAZINE

[75] Inventors: Fujio Mizukami; Tsuneji Sano, both of Tsukuba; Koji Masuda, Tokyo, all of Japan

[73] Assignees: Nissan Motor Co., Ltd.; Agency of Industrial Science & Technology, both of Japan

[21] Appl. No.: 834,962

[22] Filed: Feb. 14, 1992

[30] Foreign Application Priority Data

Feb. 15, 1991 [JP] Japan .................... 3-42276

[51] Int. Cl.⁵ .................. B01J 21/04; B01J 23/46; B01J 37/02
[52] U.S. Cl. .................................. 502/332
[58] Field of Search .................. 502/332, 439

[56] References Cited

U.S. PATENT DOCUMENTS

| | | | |
|---|---|---|---|
| 3,929,682 | 12/1975 | Kuhrt et al. | 502/332 |
| 4,124,538 | 11/1978 | Armstrong et al. | 502/332 |
| 4,748,145 | 5/1988 | Wood et al. | 502/332 |

FOREIGN PATENT DOCUMENTS

| | | | |
|---|---|---|---|
| 0365801 | 5/1990 | European Pat. Off. | |
| 1605013 | 10/1972 | France | 502/332 |
| 2027357 | 2/1980 | United Kingdom | |

Primary Examiner—W. J. Shine
Assistant Examiner—Douglas J. McGinty
Attorney, Agent, or Firm—Lowe, Price, LeBlanc & Becker

[57] ABSTRACT

A catalyst for the decomposition of hyderazine is produced by impregnating alumina with a solution of iridium salt in a solvent and then drying and firing it. In this case, ethyl alcohol is used as a solvent. Such a catalyst has high catalytic activity and durability.

3 Claims, No Drawings

METHOD OF PRODUCING A CATALYST FOR THE DECOMPOSITION OF HYDRAZINE

BACKGROUND OF THE INVENTION

1. Field of the Invention

This invention relates to a method of producing a catalyst for the decomposition of hydrazine used in a gas turbine or a thruster for an attitude control of an artificial satellite.

2. Disclosure of the Related Art

As the conventional production of the catalyst for the decomposition of hydrazine, there is a method wherein alumina obtained by the usual manner (thermal decomposition or the like) is used as an inorganic carrier and iridium (Ir) as a catalyst is dissolved in a solvent such as water or the like and substantially uniformly impregnated into the carrier in an amount of 30-40%. When hydrazine ($N_2H_4$) is contacted with the thus obtained iridium, it is decomposed according to the following reactions to produce a driving force of a rocket:

$$N_2H_4 \rightarrow 2N_2 + 2H_2$$

or $$3N_2H_4 \rightarrow 4NH_3 + H_2$$

$$2NH_3 \rightarrow N_2 + 3H_2$$

In the catalyst for the decomposition of hydrazine obtained by such a conventional method, however, an amount of iridium contributing to a catalytic reaction is hardly existent in the surface of the catalyst using the solvent such as water or the like, so that the activity is not so high, and particularly there is a problem that the catalytic activity is substantially lost when the activity of the catalyst as a whole falls down due to the sintering of iridium after the thermal endurance at a high temperature.

SUMMARY OF THE INVENTION

It is, therefore, an object of the invention to solve the aforementioned problems of the conventional technique.

According to the invention, there is the provision of a method of producing a catalyst for the decomposition of hydrazine by impregnating alumina with a solution of an iridium (Ir) salt in a solvent and then drying and firing it, characterized in that ethyl alcohol is used as the solvent dissolving the iridium salt.

DISCLOSURE OF THE PREFERRED EMBODIMENTS

The invention will be described in detail below.

At first, iridium chloride is dissolved in ethyl alcohol to prepare an impregnation solution. Then, alumina is immersed in the impregnation solution, which is dried and further fired at a given temperature in an atmosphere of hydrogen ($H_2$). In this case, there is used alumina obtained by adding aluminum alkoxide to hexylene glycol (2-methyl-2,4-pentane diol), heating it at a temperature of 101° C. to 200° C. to form a sol, hydrolyzing the resulting sol to prepare a gel, drying the resulting gel and finally firing it at a temperature of not lower than 750° C. As iridium chloride, use may be made of all iridium chlorides soluble in the solvent. Furthermore, the form of alumina may be powder or granule, or a three-dimensional honeycomb structural body may be coated with alumina.

An amount of iridium carried on the alumina is preferably 5-35% by weight based on a weight of the catalyst. Since iridium is considered to be carried from the inside of alumina, when the amount of iridium is less than 5% by weight, iridium is carried in only the inside of alumina and is not dispersed in the surface thereof, so that the given performance can not be developed. On the other hand, when it is 35% by weight, the dispersion of iridium onto the surface of alumina is sufficiently saturated, so that the addition of iridium exceeding 35% by weight is meaningless.

Moreover, when water or the like is used as a solvent, the resulting solution becomes acidic and dissolves the surface of alumina and hence iridium is adsorbed and carried in the inside of alumina. As a result, the amount of iridium added is not effectively utilized and the activity of the catalyst is degraded. On the other hand, when ethyl alcohol is used as a solvent, the resulting solution becomes not acidic and hence the amount of iridium added is effectively utilized.

The hydrazine decomposition catalyst according to the invention is preferably used in a hydrazine thruster as a driving means of an artificial satellite.

The following examples are given in illustration of the invention and are not intended as limitations thereof.

EXAMPLE 1

Into a beaker of 2000 ml in capacity was charged 599.8 g of aluminum isopropoxide [$Al(OC_3H_7)_3$], to which was added 540.9 g of hexylene glycol and then stirred for 4 hours while being heated in an oil bath at 120° C. After the temperature of the oil bath was lowered to 100° C., 449.5 g of water was added to the resulting aluminum alkoxide solution. After being left to stand over a night at this temperature, the resulting gel was placed into an egg-plant type flask and dried at 120°-170° C. under a reduced pressure to obtain 195 g of a dried gel. This gel was fired at 900° C. for 3 hours to obtain 150 g of white alumina powder. 10 g of this powder was immersed in an impregnation solution of 8.9 g of iridium hexachloride in ethyl alcohol, dried and reduced with hydrogen at 400° C. for 1 hour to obtain a catalyst No. 1. In the catalyst No. 1, the amount of iridium was 33.2% by weight.

EXAMPLE 2

The same procedure as in Example 1 was repeated except that the amount of iridium hexachloride used was 1.5 g to obtain a catalyst No. 2. In the catalyst No. 2, the amount of iridium was 5.5% by weight.

COMPARATIVE EXAMPLE 1

The same procedure as in Example 1 was repeated except that 8.9 g of iridium hexachloride was dissolved in water as a solvent to obtain a catalyst No. A. In the catalyst No. A, the amount of iridium was 33.5% by weight.

COMPARATIVE EXAMPLE 2

The same procedure as in Comparative Example 1 was repeated except that the amount of iridium hexachloride used was 1.4 g to obtain a catalyst No. B. In the catalyst No. B, the amount of iridium was 5.4% by weight.

COMPARATIVE EXAMPLE 3

The same procedure as in Example 1 was repeated except that a commercially available alumina (SCS-79 made by Rhône Poulenc SA, product fired at 900° C. for 3 hours) was used and the amount of iridium hexachloride used was 8.7 g to obtain a catalyst No. C. In the catalyst No. C, the amount of iridium was 32.5% by weight.

COMPARATIVE EXAMPLE 4

The same procedure as in Comparative Example 3 was repeated except that 8.8 g of iridium hexachloride was dissolved in water as a solvent to obtain a catalyst No. D. In the catalyst No. D, the amount of iridium was 33.0% by weight.

COMPARATIVE EXAMPLE 5

The same procedure as in Example 1 was repeated except that 8.7 g of iridium hexachloride was dissolved in acetonitrile as a solvent to obtain a catalyst No. E. In the catalyst No. E, the amount of iridium was 32.5% by weight.

COMPARATIVE EXAMPLE 6

The same procedure as in Example 1 was repeated except that the amount of iridium hexachloride used was 0.6 g to obtain a catalyst No. F. In the catalyst No. F, the amount of iridium was 2.1% by weight.

The following open cup test using 10 g of hydrazine was made with respect to the catalysts of Examples 1-2 and Comparative Examples 1-6 after the thermal endurance in inert gas at 750° C. The test results are shown in Table 1. At the same time, the amount of iridium in the surface of the catalyst was measured by using an X-ray photoelectron spectrometry (XPS).

One cup test method

After a glass vessel was placed onto a base of an electron type balance, 10 g of a liquid hydrazine was poured into the glass vessel and then the catalyst to be tested was charged thereinto, whereby weight reduction of hydrazine was measured.

TABLE 1

Test results on performance after thermal endurance in inert gas at 750° C.

| Catalyst No. | Solvent used | Kind of alumina | Ir amount (%) | Decomposition time in open cup (second) | Amount of Ir in catalyst surface measured by XPS (when Al is 1) |
|---|---|---|---|---|---|
| 1 | $C_2H_5OH$ | alumina by improved sol-gel process | 33.2 | 500 | 0.02 |
| 2 | $C_2H_5OH$ | alumina by improved sol-gel process | 5.5 | 2500 | 0.015 |
| A | $H_2O$ | alumina by improved sol-gel process | 33.5 | no decomposition | ≦0.005 |
| B | $H_2O$ | alumina by improved sol-gel process | 5.4 | no decomposition | ≦0.005 |
| C | $C_2H_5OH$ | SCS-79 made by Rhône Poulenc SA | 32.5 | 3500 | 0.015 |
| D | $H_2O$ | SCS-79 made by Rhône Poulenc SA | 33.0 | no decomposition | ≦0.005 |
| E | $CH_3CN$ | alumina by improved sol-gel process | 32.5 | 2500 | 0.01 |
| F | $C_2H_5OH$ | alumina by improved sol-gel process | 2.1 | no decomposition | 0.015 |

As seen from Table 1, when the amount of iridium is about 33%, the catalyst No. 1 (ethanol as a solvent) is very excellent in the decomposition time of hydrazine as compared with the catalysts A (water as a solvent) and E (acetonitrile as a solvent). Furthermore, the amount of Ir in the catalyst surface measured by XPS is relatively large in the catalyst No. 1 as compared with the catalysts A and E. Moreover, when the catalyst No. 1 is compared with the catalyst C, the use of alumina obtained by improved sol-gel process brings about good results as compared with the commercially available alumina.

As mentioned above, according to the invention, when iridium is carried onto alumina by impregnation, ethyl alcohol is used as a solvent dissolving iridium instead of water used in the conventional technique, whereby the amount of iridium existent in the surface of the catalyst constructing to the catalytic reaction is increased and also the thermal durability of the catalyst at high temperature is improved.

What is claimed is:

1. A method of producing a catalyst for the decomposition of hydrazine by impregnating alumina with a solution of an iridium (Ir) salt in a solvent and then drying and firing it, characterized in that ethyl alcohol is used as the solvent dissolving the iridium salt and said alumina is obtained by adding aluminum alkoxide to hexylene glycol (2-methyl-2,4-pentane diol), heating it at a temperature of 101° C. to 200° C. to form a sol, hydrolying the resulting sol to prepare a gel, drying the resulting gel and finally firing it at a temperature of not lower than 750° C.

2. The method according to claim 1, wherein said iridium salt is iridium chloride.

3. The method according to claim 1, wherein an amount of iridium carried on said catalyst is 5-35% by weight.

* * * * *